Aug. 15, 1950  B. WALKER  2,518,733
AUXILIARY VEHICLE SUSPENSION
Filed Nov. 23, 1946

INVENTOR.
Brooks Walker

Patented Aug. 15, 1950

2,518,733

UNITED STATES PATENT OFFICE 2,518,733

AUXILIARY VEHICLE SUSPENSION

Brooks Walker, Piedmont, Calif.

Application November 23, 1946, Serial No. 711,918

11 Claims. (Cl. 280—124)

1

This invention pertains to auxiliary vehicle suspension and improvements therein. Heretofore auxiliary springs have been provided on trucks and some busses, which go into action after the basic springs have been compressed a certain amount. Thus, when carrying a light load, the auxiliary springs interfered with normal easy riding and full spring action. With passenger vehicles of large capacity, such as: Air line limousines, busses, station wagons, trucks, etc., the amount of load carried varies substantially. When lightly loaded, a low spring rate (in pounds per inch of action) is desirable compared to the spring rate desired when fully loaded. To accomplish this, applicant has disclosed a structure wherein the auxiliary springs or resilient members are brought into action by the vehicle operator as desired when the load is to be increased, and rendered inactive when the load is reduced. The auxiliary resilient means are preferably carried on the spring portion of the vehicle, when inactive, to improve the riding and reduce the unsprung weight.

Other objects and features of novelty of the invention will be specifically pointed out, or will become apparent when referring, for a better understanding of the invention, to the following description taken in conjunction with the accompanying drawings, wherein.

In all figures, like numerals of reference refer to corresponding parts in the various drawings.

Figure 1:
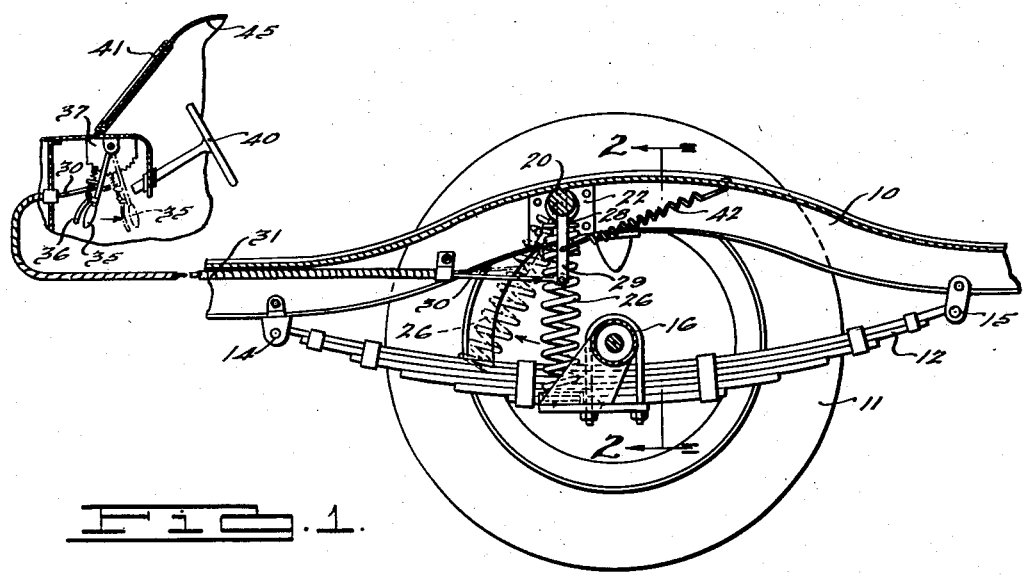
Figure 1 is a side elevation partly cut away, showing one form of the invention applied to the rear suspension of a vehicle and a sectional view of one form of the control by the operator on a reduced scale.

A vehicle frame 10 and associated body 45 having the conventional steering wheel 40 behind the windshield 41 is shown attached to supporting wheels 11 and 12 by conventional leaf springs 12 and 13, which are connected to the frame 10 by conventional shackles 14 and 15. Any other type of springs such as coil springs, torsion bars, independent springing, or pneumatic suspension could be employed wherein the wheels are attached to the chassis to yieldably support the chassis and take care of side thrusts, as well as braking torque, if present, and the other forces common to spring vehicle suspension.

The auxiliary springs 25 and 26 are shown connected to a control member 20 by suitable adapters 27 and 28, which securely hold the upper ends of said springs. A control arm 29 is attached to said control member 20 for the purpose of par-

2 tially rotating the control member 20. Control member 20 is carried in its supporting bearings 21 and 22 while it is supported in the vehicle frame 10 in a manner that will carry a substantial portion of the weight of the vehicle and heavy load, when moved to the position where the springs 25 and 26 engage auxiliary spring pads 17 and 18.

Spring pads 17 and 18 may have non-metallic or rubberlike cups 17A and 18A adapted to receive the ends of springs 25 and 26, to reduce the noise attendant on contact between the ends of springs 25 and 26 and the spring pads 17 and 18, when operating over bumpy terrain. The engagement or disengagement of springs 25 and 26 is effected through control wire 30 traveling in control conduit 31. The forward end of control wire 30 is attached to manual lever 36 operable by the vehicle driver, and held in place by a ratchet on lever 36 engaging notches in pivot plate 37 and controlled by grip 36. A spring 42 tends to rotate shaft 20 to the spring engaging position. Many other suitable controls could be used within the scope of this invention, such as hydraulic means similar to those used for the control of vehicle convertible tops, window lifts, seat regulators, etc., or means could be employed away from the driver's compartment, as a crank at the end of control element 20 for use on trucks, etc.

Figure 2:
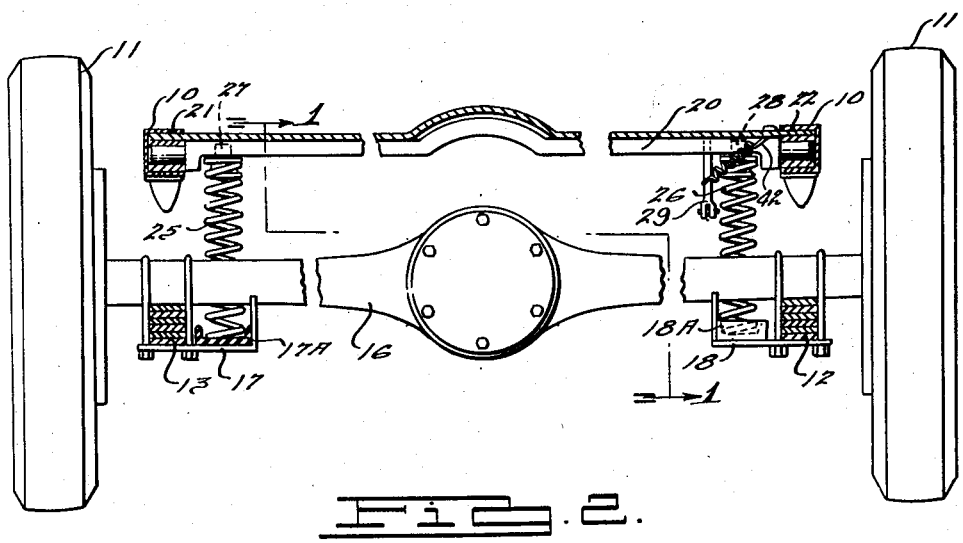
Figure 2 is a section at 2—2 of Figure 1.

In practice, when an operator is going to take on a heavy load of passengers or cargo, he operates control 35 to the forward position, so that spring 42 can rotate the springs 25 and 26 into their auxiliary load-carrying position, as shown in full line in Figures 1 and 2. The vehicle is operated like this as long as the heavy load is carried. When the load is reduced, the lever 35 is pulled back (possibly waiting for a road bump to unload the springs 25 and 26) and the vehicle is operated with the springs 25 and 26 in their inactive positions, as shown in dotted line in Figure 1. In this position, the springs 25 and 26 have no contact with the supporting wheels or axle 16, and are carried as unsprung weight to aid in the unloaded easy riding of the vehicle.

Applicant does not wish to limit this invention in any way to the details or mode of operation set forth in this specification and drawings, for it will be obvious that wide departure may be made in the way of details without departing from the spirit and scope of this invention which is set forth in the following claims.

I claim as my invention:

1. A vehicle having a body, a driver's compartment in said body, wheels for said body, structure on which said wheels rotate, resilient means for supporting said body on said structure, auxiliary resilient means movable to and from a position between said body and said structure to assist the first resilient means when in a position between said body and structure to support the body and the load carried thereby, and means operable from the driver's compartment for moving said auxiliary means to and from said positions.

2. A vehicle having a body, wheels for said body, supporting structure for said body on which said wheels rotate, resilient means for supporting said body on said structures, auxiliary resilient means, means for mounting said auxiliary resilient means for movement into and out of supporting position between said body and at least one of said structures to assist said first resilient means associated therewith to support the body, and manual means for effecting movement of said auxiliary resilient means into and out of supporting position without changing the clearance between said supporting structure and said body.

3. A vehicle having a body, pairs of supporting wheels for said body, resilient means for supporting said body on said pairs of wheels, auxiliary resilient means, means for mounting said auxiliary resilient means for movement into and out of supporting position between said body and at least one pair of said supporting wheels to assist said resilient means to support the body, and means for effecting movement of said auxiliary resilient means into and out of supporting position.

4. A vehicle having a body, pairs of front and rear supporting wheel structures for said body, a passenger compartment in said body, resilient means permanently attached between said body and said pairs of front and rear wheel structures to provide a resilient support for said body, auxiliary resilient means attached to said body and movable into and out of engagement with at least one pair of said wheel structures to assist said first resilient means to support said body when heavily loaded, and manually actuated means supported by said body for moving said auxiliary resilient means.

5. A vehicle having a sprung portion and unsprung wheels, auxiliary yielding means, means for supporting said auxiliary yielding means, manually shiftable means for interconnecting said sprung portion and the unsprung wheels for supplementing the support for the sprung portion in one position and to be ineffective to provide said support in another position, and means for moving said auxiliary yielding means to and from said positions without changing the clearance between said supporting structure and said body.

6. A vehicle having a body, a plurality of supporting wheels, yielding means between said body and said wheels for resiliently supporting said body, additional yielding means, means for supporting said additional yielding means for movement to and from a load supporting position between said body and at least one of said wheels, and control means on said body for moving said additional yielding means to and from load supporting position.

7. A vehicle having a body, wheels for supporting said body including a pair of unsprung rear wheels, leaf springs for supporting said wheels, coil springs mounted between said body and said unsprung rear wheels for movement to and from a load supporting position, and means for moving said coil springs to and from said load supporting position.

8. A vehicle having a body, front and rear unsprung wheel structures, spring means interconnecting the wheel structures and the body, additional spring means supported on said body for movement into and out of engagement with the rear wheel structure for assisting when in said last position the first said springs which connect the rear wheel structure to the body, and means for moving said additional spring means.

9. A vehicle having a body, front and rear wheel structures, spring means interconnecting the wheel structures and the body, additional spring means, means for supporting said additional spring means on said body for movement into and out of engagement with the rear wheel structure for assisting when in said last position the first said spring means which connect the rear wheel structure to the body, an arm on said supporting means, a lever within the body, and means for interconnecting the arm and said lever for moving the additional spring means to and from a position of engagement with said rear wheel structure from within the body.

10. In a vehicle having unsprung pairs of front and rear wheel structures resiliently supporting a body, a rotatable bar carried by said body, spring means supported on said bar for movement into and out of engagement with at least one of said pairs of wheel structures, and means on said bar by which said bar and spring means are moved.

11. In a vehicle having unsprung pairs of front and rear wheel structures resiliently supporting a body, movable means between said body and wheel structures, resilient means supported by said movable means for movement into and out of load supporting position between said body and one pair of wheel structures, and means for moving said movable means.

BROOKS WALKER.

REFERENCES CITED

The following references are of record in the file of this patent:

UNITED STATES PATENTS

| Number | Name | Date |
|---|---|---|
| 1,304,982 | Hofmann | May 27, 1919 |